US007203142B2

(12) United States Patent
Endo

(10) Patent No.: US 7,203,142 B2
(45) Date of Patent: Apr. 10, 2007

(54) MULTI-SOURCE SURROUND AUDIO APPARATUS

(75) Inventor: Satoshi Endo, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 635 days.

(21) Appl. No.: 10/603,830

(22) Filed: Jun. 26, 2003

(65) Prior Publication Data

US 2004/0001403 A1 Jan. 1, 2004

(30) Foreign Application Priority Data

Jun. 28, 2002 (JP) ............................ 2002-191287

(51) Int. Cl.
*G11B 7/005* (2006.01)

(52) U.S. Cl. .......................... 369/47.24; 369/2; 369/4; 369/6; 369/47.16; 386/97; 386/105

(58) Field of Classification Search .................... 369/2, 369/4, 6, 47.24; 386/97, 105
See application file for complete search history.

(56) References Cited

U.S. PATENT DOCUMENTS

| | | | | |
|---|---|---|---|---|
| 5,487,067 A * | 1/1996 | Matsushige | | 370/460 |
| 5,546,465 A * | 8/1996 | Kim | | 381/18 |
| 6,005,949 A | 12/1999 | Shimizu et al. | | 381/61 |
| 6,016,295 A * | 1/2000 | Endoh et al. | | 369/47.16 |
| 6,681,018 B1 * | 1/2004 | Asakura et al. | | 381/18 |
| 6,711,270 B2 | 3/2004 | Masuda | | |
| 2002/0006081 A1 | 1/2002 | Fujishita | | 369/1 |
| 2004/0208095 A1 * | 10/2004 | Tanaka et al. | | 369/47.16 |

FOREIGN PATENT DOCUMENTS

| | | |
|---|---|---|
| EP | 0 500 049 | 4/1998 |
| JP | 05-064300 | 3/1993 |
| JP | 5-327637 | 12/1993 |
| JP | 11-113100 | 4/1999 |
| JP | 2001-160997 | 6/2001 |
| JP | 2001-339797 | 12/2001 |
| WO | 98/33356 | 7/1998 |

OTHER PUBLICATIONS

Patent Abstracts of Japan, vol. 2002, No. 07, Jul. 3, 2002, & JP 2002 084600 A (Kenwood Corp.), Mar. 22, 2002—Abstract.

* cited by examiner

*Primary Examiner*—Wayne Young
*Assistant Examiner*—Linh T. Nguyen
(74) *Attorney, Agent, or Firm*—Wenderoth, Lind & Ponack, L.L.P.

(57) ABSTRACT

A DVD audio signal reproducer reproduces a DVD to generate a DVD reproduced audio signal. A reproduced signal determiner determines whether the DVD reproduced audio signal is a 5.1-channel digital surround audio signal or a 2-channel digital audio signal, and generates a determination signal. If the determination signal indicates that the DVD reproduced audio signal is a 5.1-channel digital surround audio signal, a digital surround effector converts the DVD reproduced audio signal to a 2-channel digital surround audio signal.

2 Claims, 2 Drawing Sheets

MULTI-SOURCE SURROUND AUDIO APPARATUS

BACKGROUND OF THE INVENTION

1. Field of the Invention

The present invention relates to a multi-source surround audio apparatus for performing, in accordance with an instruction from a user, selective surround sound reproduction of audio signals which are inputted from a plurality of sound sources including a DVD.

2. Description of the Background Art

In recent years, in the field of multi-source audio apparatuses which are capable of reproducing audio from a number of audio signal sources including DVDs, there has been a desire for a multi-source surround audio apparatus such that, if an audio signal from a given audio signal source has been recorded so as to have a surround effect, the multi-source surround audio apparatus can properly reproduce a surround audio signal based on each such audio signal. Examples of audio signal sources include: optical recording media (optical disks) such as DVDs, CDs, VCDs, and MDs; magnetic recording media on which MP3 data is recorded (note that MP3 data might also be recorded on an optical disk); FM/AM broadcast; and external optical or electric signal sources.

A multi-source surround audio apparatus must be capable of properly generating a surround audio signal from the audio signal(s) inputted from such a plurality of audio signal sources.

A DVD usually stores at least one of: an audio signal which has been recorded in a 5.1-channel digital surround format (hereinafter a "5.1ch digital surround signal"); and a digitally recorded 2-channel audio signal (hereinafter, a "2ch digital signal"). Note that, in terms of decoding methods, a 2ch digital signal stored on a DVD is similar to that carried by any audio signal source other than DVDs, e.g., a CD, (hereinafter such an audio signal source will be referred to as a "non-DVD audio signal source").

An analog 2-channel digital surround effector (hereinafter an "analog surround effector") is conventionally used to generate a 2ch analog surround audio signal based on a 2ch digital signal which is inputted from a DVD or a non-DVD audio signal source. An analog surround effector can also generate a 2ch analog surround audio signal based on a 2ch digital signal inputted from a DVD.

A5.1ch digital surround effector is conventionally used to generate a 5.1ch analog surround audio signal based on a 5.1ch digital surround signal which is inputted from a DVD.

In accordance with a user's request, a multi-source surround audio apparatus needs to switch between available audio signal sources to properly reproduce a surround audio signal from a recorded audio signal. However, in the aforementioned multi-source surround audio apparatus, one needs to switch between a 5.1ch digital surround effector and an analog surround effector, depending not only on the type of the audio signal source but also on the type of audio signal to be reproduced.

For example, the audio signal source may remain to be the same DVD, but the signal reproduced therefrom may be switched from a 5.1ch digital surround signal to a 2ch digital signal. In such a case, it is necessary to accordingly switch from the 5.1ch digital surround effector to the analog surround effector. In another case, one audio signal source may be switched to another, e.g., from a DVD to FM broadcast. Assuming that a 2ch digital signal was being reproduced from the DVD, the same analog surround effector can still be used after switching to FM broadcast.

Thus, with the conventional multi-source surround audio apparatus, a user who wishes to switch the audio signal source to a DVD will need to determine whether the reproduced signal is a 5.1ch digital surround signal or a 2ch digital signal, and accordingly select and instruct either the 5.1ch digital surround effector or the analog surround effector.

Furthermore, a 5.1ch loudspeaker system is required to reproduce a 5.1ch digital surround sound based on a 5.1ch digital surround audio signal which has been properly reproduced from a DVD by means of a 5.1ch digital surround effector. On the other hand, a 5.1ch loudspeaker system is not required to reproduce an audio signal from any non-DVD audio signal source or a 2ch digital signal from a DVD.

SUMMARY OF THE INVENTION

Therefore, an object of the present invention is to provide a multi-source surround audio apparatus which can realize surround sound reproduction of both a 5.1ch digital surround signal and a 2ch digital signal by just using a 2ch loudspeaker system instead of a 5.1ch loudspeaker system, such that the apparatus does not require a user to designate a digital surround effector or an analog surround effector based on combinations of a plurality of types of audio signal sources and a plurality of types of reproduced signals, but rather allows the appropriate surround effector to be automatically applied depending on the type of the reproduced signal, thereby enabling a surround audio signal to be reproduced.

The present invention has the following features to attain the object mentioned above.

A first aspect of the present invention is directed to a multi-source surround audio apparatus for, in accordance with an instruction from a user, performing selective surround sound reproduction of audio signals which are inputted from a plurality of sound sources including a DVD. The multi-source surround audio apparatus comprises: sound source detection means for detecting a sound source of an inputted audio signal based on the instruction from the user; DVD audio signal reproduction means for, if the detected sound source is a DVD, reproducing the DVD to generate a DVD reproduced audio signal; reproduced signal determination means for determining whether the DVD reproduced audio signal is a 5.1-channel digital surround audio signal or a 2-channel digital audio signal, and generating a determination signal indicating a result of the determination; and a digital surround effector for, if the determination signal indicates that the DVD reproduced audio signal is a 5.1-channel digital surround audio signal, converting the DVD reproduced audio signal to a 2-channel digital surround audio signal.

Thus, according to the first aspect, when a 5.1ch digital surround audio signal is reproduced from a DVD, the 5.1ch digital surround audio signal is converted into a 2ch digital surround audio signal, which can be subjected to surround sound reproduction as if it were a reproduced signal from a non-DVD audio signal source.

In a second aspect based on the first aspect, the multi-source surround audio apparatus further comprises: an analog surround effector for converting an audio signal to a 2-channel surround audio signal; and first effector driving means for, if the DVD reproduced audio signal is a 2-channel digital audio signal, activating the analog surround effector to convert the DVD reproduced audio signal to a 2-channel surround audio signal.

Thus, according to the second aspect, when a 2ch digital audio signal is reproduced from a DVD, the 2ch digital audio signal is converted into a 2ch surround audio signal, which can be subjected to surround sound reproduction as if it were a reproduced signal from a non-DVD audio signal source.

In a third aspect based on the first aspect, the multi-source surround audio apparatus further comprises: an analog surround effector for converting an audio signal to a 2-channel surround audio signal; audio signal reproduction means for, if the detected sound source is not a DVD, extracting an audio signal from the sound source and generating a reproduced audio signal therefrom; and second effector driving means for activating the analog surround effector to convert the reproduced audio signal to a 2-channel surround audio signal.

These and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
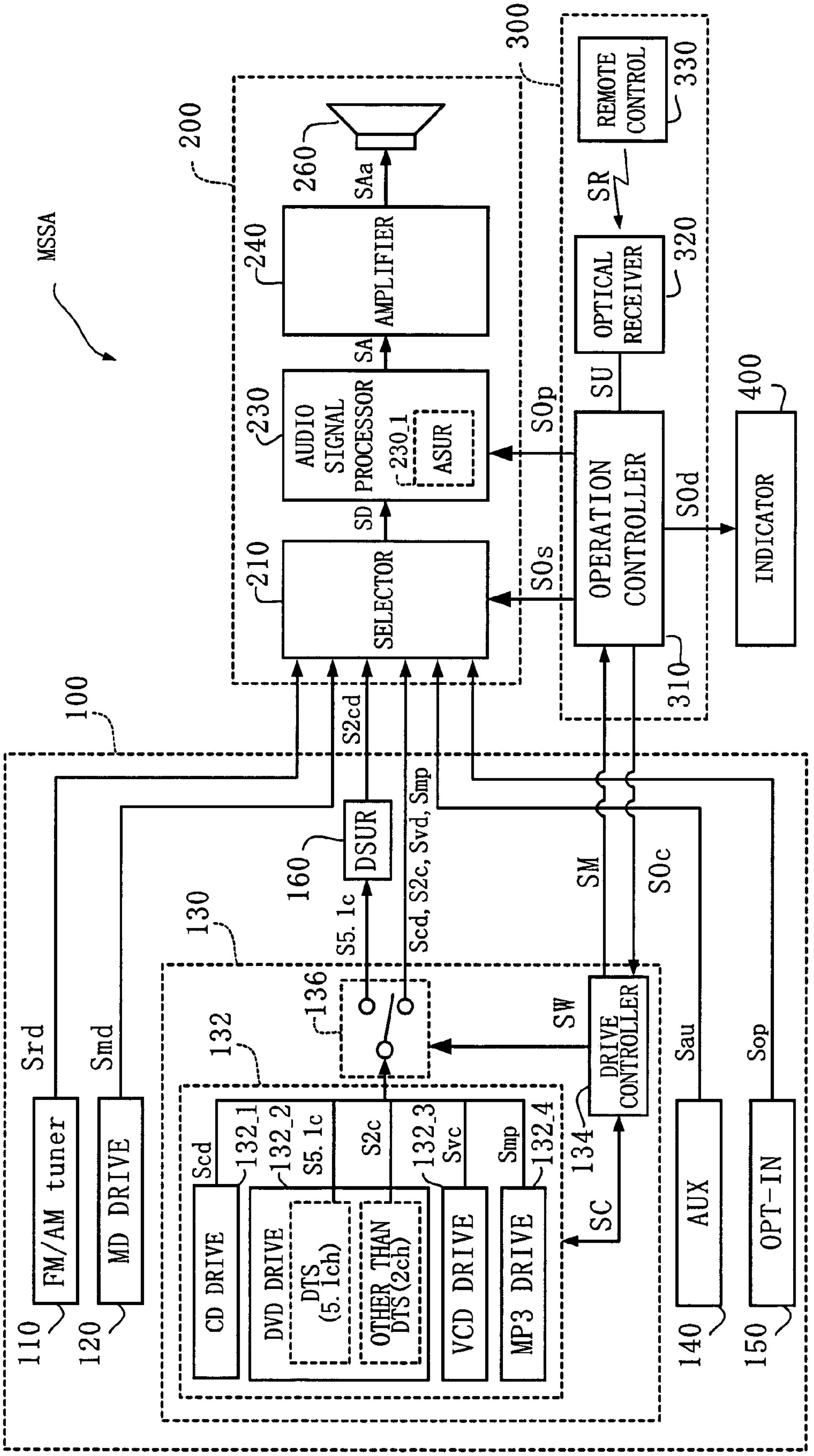
FIG. 1 is a block diagram illustrating the structure of a multi-source surround audio apparatus according to an embodiment of the present invention.

Hereinafter, with reference to FIGS. 1 and 2, a multi-source surround audio apparatus according to an embodiment of the present invention will be described. As shown in FIG. 1, the multi-source surround audio apparatus (denoted as "MSSA") generally comprises a multi-source section 100, a 2ch (2 channel) audio section 200, a control section 300, and an indicator 400. The multi-source section 100, which includes a plurality of audio signal sources, extracts an audio signal from one of the respective audio signal sources and provides the extracted audio signal the 2ch audio section 200.

The 2ch audio section 200 performs various processes for the audio signal which is provided from the multi-source section 100 so as to output 2ch audio. If the audio signal has been recorded with a surround effect, the 2ch audio which is outputted from the 2ch audio section 200 will have a surround effect. The 2ch audio section 200 is also capable of applying a surround effect to an audio signal which has not even been recorded with a surround effect (as described later).

The indicator 400, which preferably comprises a light emitting means (e.g., alight emitting diode) presents information such as the operation mode of the multi-source surround audio apparatus MSSA to the user as an optical indication. The control section 300, which is coupled to the multi-source section 100, the 2ch audio section 200, and the indicator 400, controls the overall operation of the multi-source surround audio apparatus MSSA.

The multi-source section 100 comprises an FM/AM tuner 110, an MD drive 120, a combination drive 130, an auxiliary input terminal (denoted as "AUX" in FIG. 1) 140, an optical input terminal (denoted as "OPT-IN" in FIG. 1) 150, and a 2ch digital surround effector (denoted as "DSUR" in FIG. 1)

160. The FM/AM tuner 110 receives FM or AM radio broadcast and generates a broadcast audio signal Srd, which is outputted to the 2ch audio section 200. The MD drive 120 reproduces an audio signal that is recorded on an MD®, and outputs the reproduced audio signal as an MD audio signal Smd to the 2ch audio section 200. The auxiliary input terminal 140, which is coupled to an external audio device, outputs an audio signal that is inputted from the audio device as an auxiliary audio signal Sau to the 2ch audio section 200. The optical input terminal 150, which is coupled to an external audio device having an optical output terminal, outputs an optical audio signal Sop that is inputted from the audio device to the 2ch audio section 200.

The combination drive 130 includes an optical disk drive 132, a drive controller 134, and a selection switch 136. The selection switch 136 includes an input terminal and two output terminals. The input terminal is coupled to the optical disk drive 132 so as to receive an audio signal which is reproduced from the optical disk drive 132. One of the two output terminals (hereinafter referred to as a "first output terminal") is indirectly coupled to the 2ch audio section 200, i.e., via the 2ch digital surround effector 160. The other output terminal (hereinafter referred to as a "second output terminal") is directly coupled to the 2ch audio section 200. In accordance with a selection signal SW which is inputted from the drive controller 134, the selection switch 136 selectively conducts between the input terminal and the first or second output terminal, thereby coupling the audio signal inputted from the optical disk drive 132 to the 2ch digital surround effector 160 or the 2ch audio section 200, respectively.

The optical disk drive 132 can accept different types of optical disk media. The optical disk drive 132 reads an audio signal from the mounted optical medium to the input terminal of the selection switch 136. The optical disk drive 132 is equipped with a means for detecting the type of the optical disk mounted thereto, and, as such, is recognized as a different optical disk drive for each detected type of optical disk. Thus, in the present specification, the optical disk drive 132 will be regarded as comprising distinct sub-drives: a CD drive 132_1, a DVD drive 132_2, a VCD drive 132_3, and an MP3 drive 132_4.

The CD drive 132_1 reproduces and outputs a PCM audio signal (Scd) from a CD. The DVD drive 132_2 reproduces and outputs a 5.1ch digital surround signal (S5.1*c*) or a 2ch digital signal (S2*c*) from a DVD. The VCD drive 132_3 reproduces an audio signal from a video CD, and outputs the audio signal as a video CD audio signal (Svd). The MP3 drive 132_4 reproduces audio data from an MP3 file recorded on an optical disk, and outputs the audio data as an MP3 audio signal (Smp).

The drive controller 134, which is coupled to the optical disk drive 132, controls the operation of the optical disk drive 132 while exchanging a control signal SC with the optical disk drive 132. In accordance with the control signal SC, the drive controller 134 detects the type of the optical disk which is mounted to the optical disk drive 132, and also detects whether the reproduced signal which is outputted from the DVD drive 132_2 is a 2ch digital signal S2*c* or a 5.1ch digital surround signal S5.1*c*. The drive controller 134 generates a selection signal SW which is in accordance with these detection results, and outputs the section signal SW to the selection switch 136. It is ensured that, unless the optical disk mounted to the optical disk drive 132 is a DVD, the generated selection signal SW causes the selection switch 136 to conduct between the input terminal and the second output terminal, thus allowing the reproduced audio signal which is outputted from the optical disk drive 132 to be directly outputted to the 2ch audio section 200.

In the case where a DVD is mounted to the optical disk drive 132, if the reproduced audio signal which is outputted from the DVD drive 132_2 is a 2ch digital signal S2*c*, the selection signal SW causes the selection switch 136 to conduct between the input terminal and the second output terminal, so that the 2ch digital signal S2*c* is inputted to the 2ch audio section 200. On the other hand, if the reproduced audio signal which is outputted from the DVD drive 132_2 is a 5.1ch digital surround signal S5.1*c*, the selection signal SW causes the selection switch 136 to conduct between the input terminal and the first output terminal, so that the 5.1ch digital surround signal S5.1*c* is inputted to the 2ch digital surround effector 160.

The 2ch digital surround effector 160 decodes the 5.1ch digital surround signal S5.1*c* which is received from the DVD drive 132_2 via the selection switch 136, thereby generating a 2ch digital surround signal S2*cd*. The 2ch digital surround signal S2*cd* thus generated is outputted to the 2ch audio section 200.

The 2ch audio section 200 includes a selector 210, an audio signal processor 230, an amplifier 240, and loudspeakers 260. The control section 300 preferably includes an operation controller 310, an optical receiver 320, and a remote control 330. The user can give instructions to the multi-source surround audio apparatus MSSA by operating the remote control 330. Specifically, the remote control 330 emits a remote control signal SR in accordance with the user's operation. In response to the remote control signal SR which is emitted from the remote control 330, the optical receiver 320 outputs a user instruction signal SU, which reflects the operation designated by the user, to the operation controller 310.

The operation controller 310 functions to generate, in accordance with the user instruction signal SU which has been inputted from the optical receiver 320, a combination drive control signal SOc for controlling the operation of the combination drive 130, and outputs the combination drive control signal 50*c* to the drive controller 134. Based on the combination drive control signal SOc, the drive controller 134 generates a control signal SC with which to control the optical disk drive 132. The drive controller 134 generates a combination drive state signal SM and outputs the combination drive state signal SM to the operation controller 310. The combination drive state signal SM includes medium identification information representing the type of an optical disk which is mounted to the optical disk drive 132, and operating state information concerning the operating state of the combination drive 130.

Based on the combination drive state signal SM, the operation controller 310 generates a selector control signal SOs with which to control the operation of the selector 210, and an audio signal processing control signal SOp with which to control the operation of the audio signal processor 230. The operation controller 310 outputs the generated selector control signal SOs and the audio signal processing control signal SOp to the selector 210 and the audio signal processor 230, respectively. Thus, based on the user instruction signal SU, the operation controller 310 detects which one of the FM/AM tuner 110, the MD drive 120, the combination drive 130, the auxiliary input terminal 140, and the optical input terminal 150 is being used. In other words, it is detected whether the audio signal which is inputted to the selector 210 is a broadcast audio signal Srd, an MD audio signal Smd, an auxiliary audio signal Sau, an audio signal processing control signal SOp, or a reproduced audio signal from the optical disk drive 132.

If the operation controller 310 detects that are produced audio signal from the optical disk drive 132 is being input to the selector 210, the operation controller 310 further detects, based on the combination drive state signal SM, whether a PCM audio signal Scd, a 2ch digital signal S2*c*, a video CD audio signal Svd, an MP3 audio signal Smp, or a 2ch digital surround signal S2*cd* is being inputted. Then, the operation controller 310 generates a selector control signal SOs and outputs the selector control signal SOs to the selector 210, such that the selector control signal SOs causes an input port corresponding to the particular audio signal which is detected as being inputted to be coupled to the output port. As a result, the selector 210 outputs the audio signal that is inputted at the input port designated by the selector control signal SOs to the audio signal processor 230, as audio data SD.

Furthermore, based on the user instruction signal SU, the operation controller 310 generates an audio signal processing control signal SOp and outputs the audio signal processing control signal SOp to the audio signal processor 230, in order to apply an audio processing as desired by the user to the audio data SD outputted from the selector 210. Based on the audio signal processing control signal SOp, the audio signal processor 230 activates an internal analog surround effector 230_1, for example, to generate a 2ch analog surround audio signal, which is outputted to the amplifier 240 as an analog audio signal SA. It will be appreciated that the audio data SD may be outputted as the analog audio signal SA without activating the analog surround effector 230_1, i.e., without generating a 2ch analog surround audio signal therefrom.

The amplifier 240 generates a loudspeaker driving signal SAa by amplifying the analog audio signal SA from the audio signal processor 230, and outputs the loudspeaker driving signal SAa to the loudspeakers 260. The loudspeakers 260 are driven in accordance with the loudspeaker driving signal SAa to generate sound waves for reproducing audio.

Based on the user instruction signal SU and the combination drive state signal SM, the operation controller 310 generates an operating state indication signal SOd representing the operating state of the multi-source surround audio apparatus MSSA, and outputs the operating state indication signal SOd to the indicator 400. Based on the operating state indication signal SOd, the indicator 400 presents to the user an optical indication of the operating state of the multi-source surround audio apparatus MSSA.

Next, with reference to a flowchart shown in FIG. 2, the audio reproduction operation of the multi-source surround audio apparatus MSSA will be described. Once the multi-source surround audio apparatus MSSA is turned on and begins operating, at step S2, in accordance with a user instruction signal SU, it is determined whether or not surround sound reproduction is instructed at the operation controller 310. If surround sound reproduction is instructed, control proceeds to step S4.

At step S4, based on the user instruction signal SU, it is determined by the operation controller 310 whether or not the combination drive 130 is designated as a reproduction source. If so designated, control proceeds to step S6.

At step S6, based on the user instruction signal SU and the combination drive state signal SM, it is determined by the operation controller 310 whether or not the DVD drive 132_2 is designated. Note that the remote control 330 should not be used to instruct the DVD drive 132_2 unless a DVD is actually mounted to the DVD drive 132_2. Therefore, it is assumed herein that a DVD is mounted to the DVD drive 132_2 whenever the user instruction signal SU designates reproduction from a DVD. If step S6 finds that the DVD drive 132_2 is designated, control proceeds to step S8.

At step S8, the DVD drive 132_2 is activated by the drive controller 134, the DVD mounted therein is read, and a reproduced audio signal (hereinafter referred to as a "DVD reproduced audio signal") is generated therefrom. Then, control proceeds to step S10.

At step S10, it is determined by the drive controller 134 whether or not the DVD reproduced audio signal is a 5.1ch digital surround signal S5.1*c*. If the DVD reproduced audio signal is a 5.1ch digital surround signal S5.1*c*, control proceeds to step S12.

At step S12, the drive controller 134 generates and outputs a selection signal SW for causing the input terminal of the selection switch 136 to be coupled to the first output terminal. As a result, the 5.1ch digital surround signal S5.1*c* reproduced from the DVD by the DVD drive 132_2 is inputted to the 2ch digital surround effector 160. Then, control proceeds to step S14.

At step S14, the 2ch digital surround effector 160 generates a 2ch digital surround signal S2*cd* by decoding the 5.1ch digital surround signal S5.1*c* which has been inputted via the selection switch 136, and outputs the generated 2ch digital surround signal S2*cd* to the selector 210. Then, control proceeds to step S16.

At step S16, the operation controller 310 inputs an audio signal processing control signal SOp to the audio signal processor 230 to activate the analog surround effector 230_1. Then, control proceeds to step S28.

At step S18, the operation controller 310 inputs a selector control signal SOs to the selector 210 to cause the reproduced audio signal, which is inputted to the input port of the selector 210, to be outputted as audio data SD to the audio signal processor 230. In the case where the 2ch digital surround signal S2*cd* which has been generated at step S14 is inputted to the selector 210, the 2ch digital surround signal S2*cd* is inputted to the audio signal processor 230 as audio data SD; the analog surround effector 230_1 which has been activated at step S16 generates a 2ch analog surround signal by decoding the audio data SD (2ch digital surround signal S2*cd*); and the generated 2ch analog surround signal is outputted to the amplifier 240 as an analog audio signal SA. After step S18, control proceeds to step S20.

At step S20, the amplifier 240 generates a loudspeaker driving signal SAa by amplifying the analog audio signal SA, and outputs the loudspeaker driving signal SAa to the loudspeakers 260, thereby reproducing audio. Then, control returns to the aforementioned step S2.

On the other hand, if the aforementioned step S2 finds that the user has not instructed surround sound reproduction (i.e., following the "No" path), control proceeds to step S22.

At step S22, the drive controller 134 generates a selection signal SW for causing the selection switch 136 to conduct between the input terminal and the second output terminal. As a result, any audio signal that is reproduced by the combination drive 130 is directly outputted to the selector 210, without being processed by the 2ch digital surround effector 160. Then, control proceeds to the aforementioned step S24.

At step S24, the analog surround effector 230_1 is stopped. Then, control proceeds to the aforementioned step S18.

At step S18 following step S24, the audio data SD which has been inputted from the selector 210 is outputted to the amplifier 240 as an analog audio signal SA, without being decoded by the audio signal processor 230 (analog surround effector 230_1) for generating a 2ch analog surround signal therefrom.

On the other hand, if the aforementioned step S4 finds that the combination drive 130 is not designated (i.e., following the "No" path), control proceeds to step S26.

At step S26, as in step S16, the operation controller 310 inputs an audio signal processing control signal SOp to the audio signal processor 230 to activate the analog surround effector 230_1. Then, control proceeds to the aforementioned step S28.

At step S28, an audio signal is extracted from one of the sources which is designated by the user instruction signal SU (from among the FM/AM tuner 110, the MD drive 120, the auxiliary input terminal 140, and the optical input terminal 150), and the extracted audio signal is outputted to the selector 210. Then, control proceeds to the aforementioned step S18.

At step S18 following step S28, the audio signal processor 230 (analog surround effector 230_1) generates a 2ch analog surround signal by decoding the audio data SD which has been inputted from the selector 210, and outputs the 2ch analog surround signal to the amplifier 240 as an analog audio signal SA.

On the other hand, if the aforementioned step S6 finds that the DVD drive 132_2 is not designated (i.e., following the "No" path), control proceeds to the aforementioned step S26. After the 2ch digital surround effector 160 is activated at step S26, at step S28, an audio signal is extracted from one of the sources which is designated by the user instruction signal SU (from among the CD drive 132_1, the DVD drive 132_2, and the MP3 drive 132_4), and the extracted audio signal is outputted to the selector 210.

On the other hand, if the aforementioned step S10 finds that the reproduced signal from the DVD is a 2ch digital signal S2*c* (i.e., following the "No" path), control proceeds to step S30.

At step S30, as in step S22, the drive controller 134 generates a selection signal SW for the selection switch 136 to conduct between the input terminal and the second output terminal. As a result, the 2ch digital signal S2*c* which has been outputted from the DVD drive 132_2 is outputted to the selector 210 directly, i.e., without going through the 2ch digital surround effector 160. Thus, after steps S16 and S18, the 2ch digital signal S2*c* is decoded by the analog surround effector 230_1 in the audio signal processor 230, whereby a 2ch analog surround signal is generated.

Figure 2:
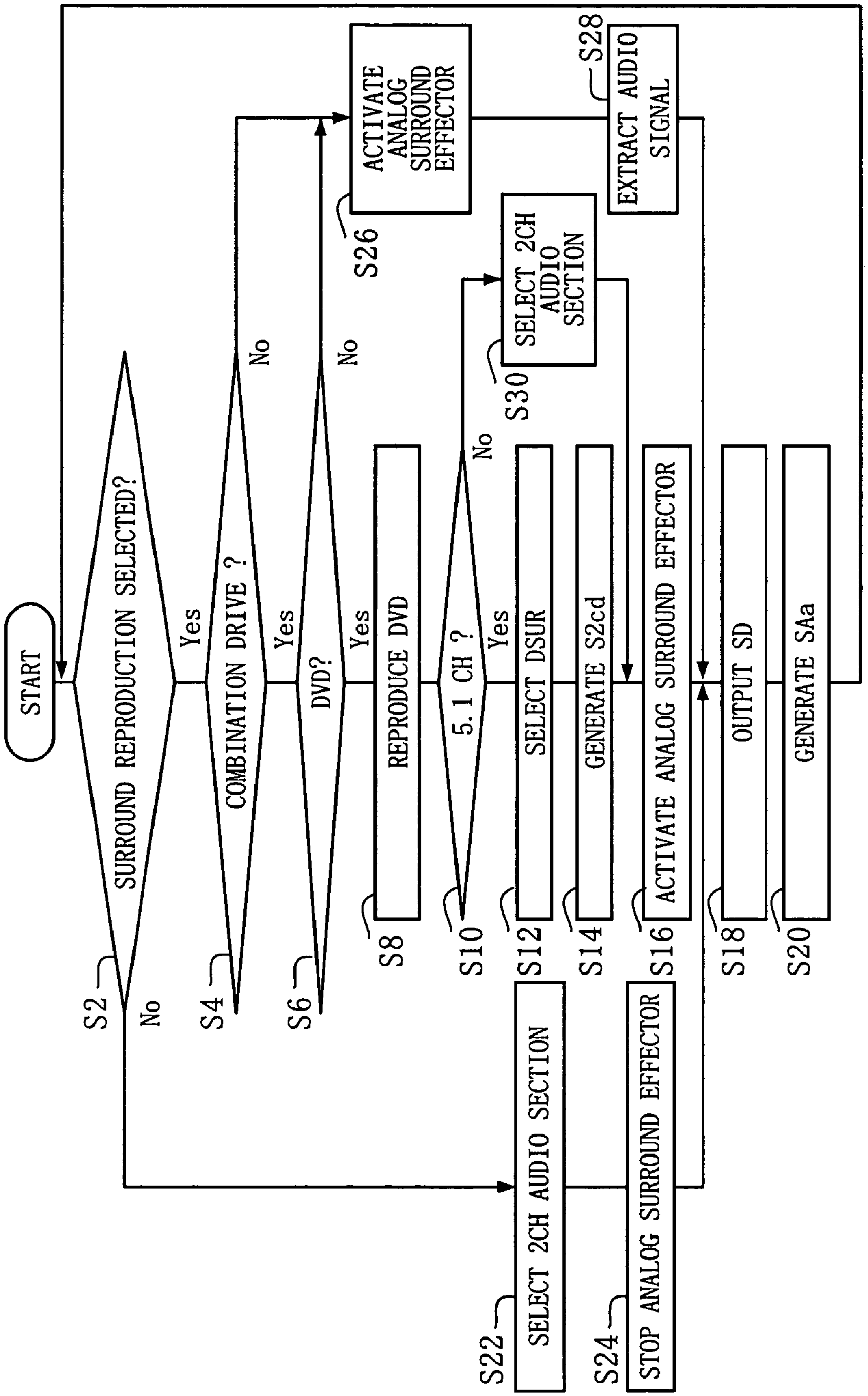
FIG. 2 is a flowchart illustrating the operation of the multi-source surround audio apparatus shown in FIG. 1.

As described above, since the overall control is returned to step S2 after generating a loudspeaker driving signal SAa to produce a sound through the loudspeakers 260 at step S20, the steps illustrated in the flowchart of FIG. 2 are repeatedly performed, so that surround sound reproduction can be properly performed in accordance with the reproduced signal from the medium, in a quick response to the user's operation on the remote control. Even if the recorded audio signal switches from 5.1-channel to 2-channel for each track of a DVD, or vice versa, surround sound reproduction can still be properly performed. By employing the 2ch digital surround effector 160 instead of a 5.1ch decoder, there is an advantage in that the same loudspeaker system can always be used in the multi-source surround audio apparatus MSSA, which is also capable of reproducing a plurality of media other than DVDs.

The term "5.1ch digital" audio format, as generally used throughout the specification, is a notion encompassing specific formats such as Dolby AC-3 or DTS.

While the invention has been described in detail, the foregoing description is in all aspects illustrative and not restrictive. It is understood that numerous other modifications and variations can be devised without departing from the scope of the invention.

What is claimed is:

1. A multi-source surround audio apparatus for, in accordance with an instruction from a user, performing selective surround sound reproduction of audio signals which are inputted from a plurality of sound sources including a DVD, said apparatus comprising:

sound source detection means for detecting a sound source of an inputted audio signal based on the instruction from the user;

DVD audio signal reproduction means for, if the detected sound source is a DVD, reproducing the DVD to generate a DVD reproduced audio signal;

audio signal reproduction means for, if the detected sound source is not a DVD, extracting an audio signal from the sound source of the inputted audio signal, and generating a reproduced audio signal therefrom;

reproduced signal determination means for determining whether the DVD reproduced audio signal is a 5.1-channel digital surround audio signal or a 2-channel digital audio signal, and generating a determination signal indicating a result of the determination; and a digital surround effector for, if the determination signal generated by said reproduced signal determination means indicates that the DVD reproduced audio signal is a 5.1-channel digital surround audio signal, converting the DVD reproduced audio signal to a 2-channel digital surround audio signal;

an analog surround effector for converting an audio signal to a 2-channel surround audio signal;

first effector driving means for, if the determination signal generated by said reproduced signal determination means indicates that the DVD reproduced audio signal is a 2-channel digital audio signal, activating said analog surround effector to convert the DVD reproduced audio signal to a 2-channel surround audio signal; and sound effector driving means for activating said analog surround effector to convert the reproduced audio signal to a 2-channel surround audio signal, wherein said first effector driving means is further for activating said analog surround effector to convert the 2-channel digital surround audio signal converted by said digital surround effector to a 2-channel surround audio signal.

2. A multi-source surround audio apparatus for, in accordance with an instruction from a user, performing selective surround sound reproduction of audio signals which are inputted from a plurality of sound sources including a DVD, said apparatus comprising:

a sound source detection unit for detecting a sound source of an inputted audio signal based on the instruction from the user;

a DVD audio signal reproduction unit for, if the detected sound source is a DVD, reproducing the DVD to generate a DVD reproduced audio signal;

an audio signal reproduction unit for, if the detected sound source is not a DVD, extracting an audio signal from the sound source of the inputted audio signal, and generating a reproduced audio signal therefrom;

a reproduced signal determination unit for determining whether the DVD reproduced audio signal is a 5.1-channel digital surround audio signal or a 2-channel digital audio signal, and generating a determination signal indicating a result of the determination; and a digital surround effector for, if the determination signal generated by said reproduced signal determination unit indicates that the DVD reproduced audio signal is a 5.1-channel digital surround audio signal, converting the DVD reproduced audio signal to a 2-channel digital surround audio signal;

an analog surround effector for converting an audio signal to a 2-channel surround audio signal;

a first effector driving unit for, if the determination signal generated by said reproduced signal determination unit indicates that the DVD reproduced audio signal is a 2-channel digital audio signal, activating said analog surround effector to convert the DVD reproduced audio signal to a 2-channel surround audio signal; and a sound effector driving unit for activating said analog surround effector to convert the reproduced audio signal to a 2-channel surround audio signal, wherein said first effector driving means is further for activating said analog surround effector to convert the 2-channel digital surround audio signal converted by said digital surround effector to a 2-channel surround audio signal.

* * * * *